Feb. 3, 1970          G. P. BOYLE          3,493,439
EXPENDABLE IMMERSION PLUG-IN THERMOCOUPLE UNIT
Filed Feb. 28, 1966
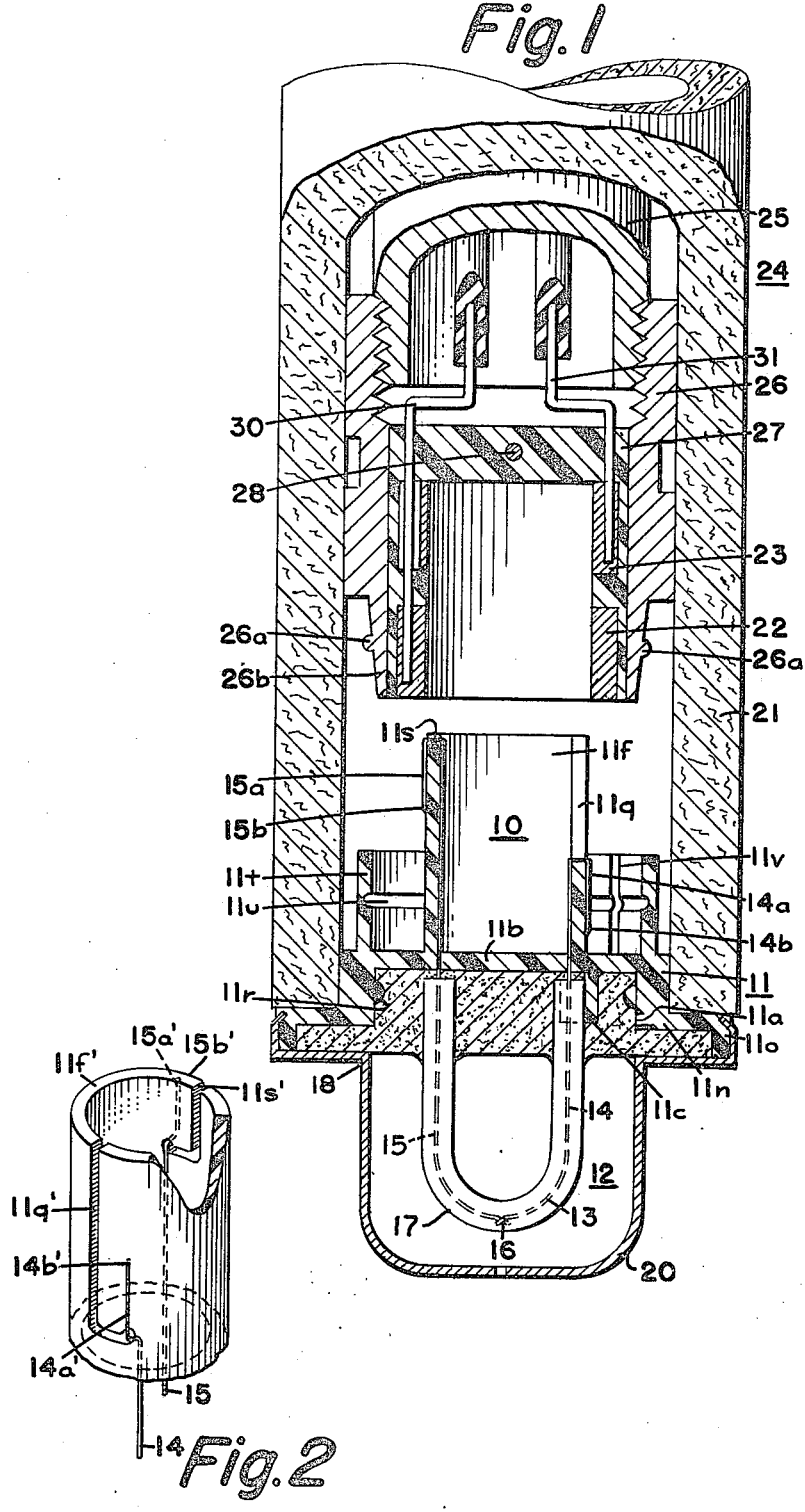

United States Patent Office 3,493,439
Patented Feb. 3, 1970

3,493,439
EXPENDABLE IMMERSION PLUG-IN THERMOCOUPLE UNIT
Gerald P. Boyle, Philadelphia, Pa., assignor to Leeds & Northrup Company, Philadelphia, Pa., a corporation of Pennsylvania
Filed Feb. 28, 1966, Ser. No. 530,576
Int. Cl. H01v 1/04
U.S. Cl. 136—234     6 Claims

ABSTRACT OF THE DISCLOSURE

An expendable immersion plug-in thermocouple unit wherein the thermocouple consists of very fine noble metal wires having a cross-sectional area less than about 64 circular mils and the ends of the fine wires remote from the hot junction are supported by resilient means carried by body structure of the unit, the ends of said thermocouple wires being sealed to a portion of the body structure to form from portions of the fine wires adjacent thereto the contacts of one element of a plug-in contact structure for engagement with a mating electrical plug-in contact structure.

---

This invention relates to expendable immersion plug-in temperature responsive units and has for an object the provision of an improved construction for an expendable immersion temperature responsive unit which contributes to a reduction in the manufacturing costs of such units without loss of the high accuracy and good performance which have been characteristic of prior expendable immersion plug-in temperature responsive units embodying the basic concept of the fast acting totally expendable immersion thermocouple units as disclosed in Mead Patent No. 2,999,121.

Since the introduction of expendable immersion thermocouple units into the art of measuring the temperature of molten metals such as molten steel, such units have substantially replaced all other types of devices for measuring the temperature of baths of molten steel. Since the introduction of the totally expendable immersion thermocouple units into the art of bath pyrometry, there have been a succession of improvements made in order to make the expendable thermocouple units easier to use and less expensive to manufacture.

Many improvement patents have issued to various inventors; nevertheless, up to the present time, all of them have included the basic concept of the aforesaid Mead patent, wherein an expendable thermocouple unit is comprised of a body member having a refractory protected noble metal thermocouple projecting from an immersion end thereof and joined within the body member to contact structures of compensating lead wire material with the contacts extending outwardly from the opposite ends of the body for plug-in connection with a connector element carried by a holder.

One feature of the Mead invention was the use of noble metal elements of very fine wire for the construction of the thermocouple. Due to the fragile nature of such fine wires, it has always been considered absolutely necessary to join them within the body member to elements of compensating lead wire having a substantial cross-sectional area to provide a heat sink within the body to prevent rise in temperature of the points of connection between the noble metal wires and the compensating lead wires, and secondly, to provide contact structure which would be sufficiently rugged to permit the use of a quick acting plug-in connection. Examples of other U.S. Letters Patent which show expendable thermocouple units utilizing contact structures secured to the fine wires of the thermocouple within the body, are Patent No. 2,993,944, No. 3,011,005, No. 3,024,295, No. 3,048,642, No. 3,055,961, No. 3,169,401 and No. 3,201,277. Such construction is also shown in Davies application, Ser. No. 193,706, filed May 10, 1962, now U.S. Patent 3,298,874, issued Jan. 17, 1967.

Efforts to lower the manufacturing cost of totally expendable immersion thermocouple units have resulted in using smaller wire sizes for the elements of the noble metal thermocouple, miniaturizing in general and using smaller diameter cardboard tube structures to support the thermocouple. However, during all of this time, it has always been considered an absolute necessity to include elements of heavier material to form the contact structures of the expendable thermocouple unit because of the extreme fineness in the cross-section of the noble metal thermocouple elements.

Applicant has discovered that in accordance with the present invention, plug-in contact may be made directly with the very small diameter wire sizes of the noble metal elements of the thermocouple in spite of their small size and fragility, thus enabling a further reduction in the manufacturing cost of expendable immersion thermocouple units by elimination from the expendable units per se, all compensating lead wire material and therefore any connections between compensating lead wire materials and the very fine wire thermocouple elements within the body of the expendable immersion thermocouple units.

In accordance with the present invention, there is provided a fast acting totally expendable immersion temperature responsive unit comprising a body structure including heat insulating material and a heat sensing element having a heat sensitive portion protruding from an immersion end of the body structure, the protruding portion being completely encased in a heat transmitting, electrically insulating refractory material. Means is provided to seal the protruding refractory encased sensitive element in place in the body structure, to prevent ingress of molten material thereto and portions of the sensitive element consisting of very fine wires having a cross-sectional area less than about 64 circular mils, are arranged relative to back-up material at the opposite end of the body structure to form one element of a plug-in connector for engagement with a mating electrical plug-in contact structure. In the preferred form of the invention, the heat sensing element comprises a thermocouple consisting of a pair of thermocouple wires, each wire having a cross-sectional area less than about 64 circular mils and each having a length less than about 3 inches. The wires are connected to form the heat sensitive portion, i.e., the hot junction. The back-up material at the opposite end of the body structure is preferably made from resilient plastic material and the opposite ends of the thermocouple wires are sealed or otherwise secured to the resilient plastic material to maintain them in place.

For further objects and advantages of the invention, reference may be had to the following description taken in conjunction with the accompanying drawings, in which:

FIG. 1 is a view partly in section of a temperature responsive unit embodying the present invention; and FIG. 2 is a fractional perspective view of a modification of the contact support of the temperature responsive unit shown in FIG. 1.

Referring to FIG. 1, there is shown a temperature responsive unit 10 utilizing a body 11, preferably made from molded plastic. While the body 11 has been illustrated as of one piece construction, it will be understood that the various portions thereof may be separate elements. The body 11 comprises an open end cup portion 11a, having a closed end formed by a transverse wall 11b. The body 11 includes within the cup portion 11a a support structure illustrated in the form of an extension 11c which, as hereinafter to be described, is adapted to hold a temperature responsive device 12. The opposite side of the transverse wall 11b is provided with a thin-walled tubular extension 11f. The tubular extension 11f is provided with a deep slot 11q and a short slot 11s. The open end of the cup portion 11a is provided with a flange 11n and a rim portion 11o. The inner wall of the cup portion 11a is provided with an inwardly extending protuberance 11r which may extend entirely around the inner circumference of the cup portion 11a. The body 11 as thus far described is generally similar in construction to the body member 11, disclosed in FIG. 2 of the aforesaid Davies application. However, the body member 11 in the present application is substantially shorter in overall length, the purpose of which will now be described.

The temperature responsive device 12 has been illustrated in the form of a thermocouple 13, which comprises a pair of serially connected thermocouple wires 14 and 15 joined together to form a hot junction 16. The hot junction 16 and the adjacent portions of the thermocouple wires 14 and 15 are encased in electrical insulating heat transmitting material which may take the form of a bent quartz tube 17. A thermocouple assembly of this type is disclosed in the aforesaid Mead Patent No. 2,999,121 and said Davies application. However, it is important to note in the present application that the fine thermocouple wires 14 and 15 are not connected to larger electrical conductors of compensating lead wire material within the body member 11, as in the aforesaid patents and application, but instead, the opposite ends of the thermocouple wires 14 and 15 provide the contact portions 14a and 15a for the expendable unit 10.

As may be seen in FIG. 1, the free end of the thermocouple wire 14 is bent over through the deep slot 11q and the free end of the thermocouple wire 15 is bent over through the shallow slot 11s. The extreme ends of these thermocouple wires at 14b and 15b are fused to the plastic extension 11f by means of heat and a slight pressure, such as by applying the tip of a soldering iron or other suitable heating element to the platinum and platinum-10% rhodium wires, so as to embed the ends of the wires into the plastic extension 11f. This forms a very strong joint when the heat is removed and the plastic returns to room temperature. In fact, it has been found that the joint between the ends of the wires and the plastic is stronger than the wires used, if the wires be as small gauge such as No. 34 B & S. This construction secures the ends of the thermocouple wires 14 and 15 to the extension 11f and thereby maintains the contact portions 14a and 15a in fixed position relative to extension 11f.

The extension 11c is adapted to hold the tube 17 in place during filling of the cup 11a with a refractory cement 18; the refractory cement 18 is adapted to be retained in the cup portion 11a by means of the inwardly extending protuberance 11r and the flange portion 11n is adapted to abut against the end of a heat insulating tube 21, which preferably is made from hard paper or equivalent material and is capable of insulating the portion of the plastic body 11 which is within the tube 21, from the molten bath for the short period of time required for the thermocouple 13 to obtain a temperature measurement. Cooperating with the heat insulating tube 21 is the refractory cement 18, which fills the cup portion 11a, and itself forms a rigid body having electrical and heat insulating properties, all as disclosed and claimed in the aforesaid Davies application. As will be understood from the patents referred to above, various suitable cements known to those skilled in the art may be used.

In measuring the temperature of materials which have a high melting point such, for example, as molten steel, temperatures in the order of 3,000° F. and above are frequently encountered. For such temperature measurements, the thermocouple wires 14 and 15 will be made of noble metals, such, for example, as platinum and platinum-rhodium. In order to keep the cost per measurement as low as possible when employing an expendable, that is to say a "throw-away" unit, the thermocouple elements 14 and 15 should not only be of small diameter such, for example, as less than about 8 mils, but should also be of short length. In my construction, it has been found possible to limit the length of the thermocouple wires 14 and 15 to less than about 3 inches, even while using portions of the wires for contact structures. While thermocouple wires as short as two inches in length were utilized in the aforesaid Mead Patent No. 2,999,121, it will be recalled that it was necessary to connect the free ends of such thermocouple wires to contact elements of compensating lead wire material. In accordance with the present invention, this requirement has been eliminated and the free ends 14a and 15a of the thermocouple wires 14 and 15 themselves provide the contacts for the expendable unit 10. Since the diameters of the thermocouple wires 14 and 15 are very small, i.e., less than about 8 mils in diameter, the amount of friction which they produce with mating contacts 22 and 23 of a manipulator 24 is relatively low. Accordingly, to insure that the expendable unit 10 and the tube 21 carried thereby do not fall off the manipulator 24, the body 11 is provided with locking structure 11t, which is adapted to cooperate with locking structure carried by the manipulator 24 to releasably hold the expendable unit 10 and the tube 21 on the manipulator 24.

The manipulator 24 is similar in construction to the manipulator illustrated in FIG. 8 of the aforesaid patent No. 3,048,642. It comprises a section of pipe 25 threaded at its lower end and to which is secured a threaded coupling 26. The lower end of the coupling 26 is adapted to receive a contact block 27 pinned thereto by means of a cross pin 28. The contact block 27 preferably is of resilient material, such as neoprene rubber and is adapted to have molded therein the pair of contact rings 22 and 23. The rings 22 and 23 are made of appropriate compensating material, depending upon the materials of the thermocouple elements 14 and 15 which they are adapted directly to engage. The rings 22 and 23 are respectively connected to compensating lead wires 30 and 31, which preferably comprise a lead wire cable extending to the opposite end of the manipulator 24. At that end of the manipulator 24, the pipe 25 preferably is provided with a handle and lead wire cable extends from the handle for connection to a suitable temperature measuring and recording instrument.

As may be seen in FIG. 1, the lower end of the coupling 26 is tapered and provided with a bead or projection 26a extending around the periphery thereof. The projection 26a may extend completely around the periphery of coupling 26 or it may be of segmental construction. The bead 26a is adapted to be received with a snap fit in a corresponding groove 11u in the locking structure 11t of a body structure 11 on the expendable unit 10, thus providing a "snap-bead" type of connection. The end of the coupling 26 is tapered at 26b to facilitate entry of the bead 26a into the groove 11u. Additionally, the locking structure 11t is provided with one or more longitudinal slots 11v so as to permit the structure 11t to spread and readily receive the tapered end 26b and projection 26a of the coupling 26. The locking structure is particularly desirable on expendable thermocouple units utilizing small contact wires as disclosed herein, in order to insure that the units will be retained on the end of the manipulator 24 and not slide off, thereby breaking the electrical circuit before the temperature measurement is completed.

Referring to FIG. 2, there is illustrated a modification of the contact supporting structure for the thermocouple 13. In FIG. 2, the body extension 11f' is provided with a deep right angle slot 11q' and a shallow right angle slot 11s'. As may be seen in FIG. 2, the thermocouple wires 14 and 15 are adapted to be received in the lower portions of the respective slots 11q' and 11s' and the contact portions for the thermocouple wires 14 and 15 are respectively provided by the portions 14a' and 15a'. The extreme ends 14b' and 15b' of the thermocouple wires are adapted to be sealed or fused to the outer surface of the extension 11f', as by a combination of heat and pressure, in the manner previously described in connection with FIG. 1. It will be noted in FIG. 2 that the thermocouple wires 14 and 15 are not bent back along themselves, and thus, the length of material required for the thermocouple wires 14 and 15 in the modifications shown in FIG. 2 is less than that shown in the embodiment of FIG. 1. Thus, by utilizing the contact construction illustrated in FIG. 2, the amount of the high cost thermocouple material used may further be decreased.

The exterior cylindrical surface of the cup portion 11a is tapered slightly to fit like a plug in the end of the tube 21 in the manner disclosed in the aforesaid Davies application. A protective cap 20 is adapted to surround the outwardly projecting portion of the thermocouple 13 with the cap being secured to the combined flange 11n and rim 11o of the body 11. The protective cap 20 is of the type disclosed in the aforesaid Mead patent and preferably is made from a thin metal material, so that it will melt or be consumed rapidly during immersion in a molten bath, the temperature of which is being measured.

As pointed out in the aforesaid Davies application, the plastic material utilized for the body 11 may have a softening point below 200° F. and a melting point as low as about 400° F. Various plastic materials, such as nylon, polyethylene and high impact polystyrene, or equivalents may be used.

It is to be understood that the invention is not limited to the specific arrangements shown and that changes and modifications may be made within the scope of the appended claims.

What is claimed is:

1. An expendable immersion plug-in thermocouple unit comprising
   a thermocouple including a pair of very fine thermocouple wires each having a cross sectional area of less than about 64 circular mils [and a length less than about 3 inches],
   said wires being connected to form a hot junction,
   a heat transmitting electrically insulating refractory material encasing said hot junction and the adjacent portions of said thermocouple wires,
   body structure supporting said refractory encased portion of said thermocouple in protruding relation from the immersion end of said body structure,
   means for sealing said protruding refractory encased portion of said thermocouple in place in said body structure to prevent ingress of molten material thereto,
   said body structure having a portion at the opposite end thereof providing resilient back-up structure for portions of said thermocouple wires adjacent the opposite ends of said thermocouple wires remote from said hot junction, and
   means sealing said opposite ends of said thermocouple wires to said back-up structure for maintaining said portions of said thermocouple wires fixed in place and drawn tightly over spaced areas of said back-up structure so that said portions of said thermocouple wires provide the electrical contacts for said unit.

2. An expendable immersion plug-in thermocouple unit according to claim 1 wherein said back-up structure includes resilient plastic material and said opposite ends of said thermocouple wires are heat sealed to said plastic material.

3. An expendable immersion plug-in thermocouple unit according to claim 1 wherein said body structure includes means thereby for releasably securing the unit to a manipulator.

4. An expendable immersion plug-in thermocouple unit according to claim 3 including a manipulator, and structure on said manipulator cooperating with said means on said body structure for releasably securing said unit to said manipulator.

5. An expendable plug-in thermocouple unit comprising:
   a thermocouple of very fine wires having a cross-sectional area less than about 64 circular mils and joined together at one of their ends to form a hot junction,
   a member of meltable, electrically insulating material disposed at the terminal ends of said wires, and
   electrical contacts of a plug-in connector for said thermocouple comprised of bare portions of said wires drawn tightly over spaced areas of said member of meltable material with portions of said wires fused in said meltable material to secure said electrical contacts in place on said member of meltable material.

6. An expendable plug-in thermocouple unit comprising:
   a thermocouple of very fine wires having a cross-sectional area less than about 64 circular mils and joined together at one of their ends to form a hot junction,
   a member of resilient electrically insulating material disposed at the terminal ends of said wires, and
   electrical contacts of a plug-in connector for said thermocouple comprised of bare portions of said wires drawn tightly over spaced areas of said member of resilient electrical insulating material with portions of said wires sealed to said material by sealing means to secure said electrical contacts in place on said member.

References Cited

UNITED STATES PATENTS

| | | | |
|---|---|---|---|
| 2,999,121 | 9/1961 | Mead | 136—234 |
| 3,048,642 | 8/1962 | Parker | 136—234 |
| 3,267,732 | 8/1966 | Hance | 136—230 X |
| 3,298,874 | 1/1967 | Davies | 136—232 |

WINSTON A. DOUGLAS, Primary Examiner

M. J. ANDREWS, Assistant Examiner